US009021169B2

(12) United States Patent
Lee et al.

(10) Patent No.: US 9,021,169 B2
(45) Date of Patent: Apr. 28, 2015

(54) BUS SYSTEM INCLUDING ID CONVERTER AND CONVERTING METHOD THEREOF

(75) Inventors: Beomhak Lee, Seoul (KR); Sangwoo Rhim, Yongin-si (KR); Euicheol Lim, Hwaseong-si (KR); Jae Young Hur, Hwaseong-si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 51 days.

(21) Appl. No.: 13/272,751

(22) Filed: Oct. 13, 2011

(65) Prior Publication Data

US 2012/0096199 A1   Apr. 19, 2012

(30) Foreign Application Priority Data

Oct. 13, 2010   (KR) .......................... 10-2010-0099958

(51) Int. Cl.
    *G06F 13/00* (2006.01)
    *G06F 13/14* (2006.01)
    *G06F 13/42* (2006.01)

(52) U.S. Cl.
    CPC ................ *G06F 13/14* (2013.01); *G06F 13/42* (2013.01)

(58) Field of Classification Search
    USPC ................... 710/110, 107, 240, 105; 711/164
    See application file for complete search history.

(56) References Cited

U.S. PATENT DOCUMENTS

| 5,911,053 | A  | * | 6/1999 | Pawlowski et al. | ........... 710/307 |
| 6,721,836 | B2 | * | 4/2004 | Kim | .............................. 710/240 |
| 2002/0019900 | A1 | * | 2/2002 | Kim | .............................. 710/240 |
| 2003/0191884 | A1 | * | 10/2003 | Anjo et al. | ..................... 710/307 |
| 2008/0209099 | A1 | * | 8/2008 | Kloeppner et al. | ........... 710/314 |
| 2012/0137145 | A1 | * | 5/2012 | Ramanadin et al. | .......... 713/300 |

FOREIGN PATENT DOCUMENTS

| JP | 2000-235490 | * | 8/2000 |
| JP | 2009-145960 | * | 7/2009 |
| KR | 1020080025543 | | 3/2008 |

* cited by examiner

*Primary Examiner* — Tim T Vo
*Assistant Examiner* — Kim T. Huynh
(74) *Attorney, Agent, or Firm* — F. Chau & Associates, LLC

(57) ABSTRACT

A bus system includes a plurality of master devices each of which issues a transaction request having a first transaction identifier with a first bit width and a slave device responding to the transaction request having a second transaction identifier with a second bit width and supplying a transaction response having the second transaction identifier to the plurality of master devices. The embodiment further comprises a bus configured to connect one of the plurality of master devices and the slave device; and an ID converter configured to connect the bus and the slave device and to map the first transaction identifier to the second transaction identifier for providing the second transaction identifier to the slave device and map the second transaction identifier to the first transaction identifier for providing the first transaction identifier to the one of the plurality of master devices.

17 Claims, 13 Drawing Sheets

Fig. 6

| F | ID_M | ID_S | CNT | |
|---|---|---|---|---|
| 1'b1 | 3'b000 | 6'b0000001 | 1 | ~441 |
| 1'b0 | 3'b001 | | 0 | ~442 |
| 1'b0 | 3'b010 | | 0 | ~443 |
| 1'b0 | 3'b011 | | 0 | ~444 |
| 1'b0 | 3'b100 | | 0 | ~445 |
| 1'b0 | 3'b101 | | 0 | ~446 |
| 1'b0 | 3'b110 | | 0 | ~447 |
| 1'b0 | 3'b111 | | 0 | ~448 |

| F | ID_M | ID_S | CNT | |
|---|---|---|---|---|
| 1'b1 | 3'b000 | 6'b0000001 | 1 | ~441 |
| 1'b1 | 3'b001 | 6'b1000000 | 1 | ~442 |
| 1'b0 | 3'b010 | | 0 | ~443 |
| 1'b0 | 3'b011 | | 0 | ~444 |
| 1'b0 | 3'b100 | | 0 | ~445 |
| 1'b0 | 3'b101 | | 0 | ~446 |
| 1'b0 | 3'b110 | | 0 | ~447 |
| 1'b0 | 3'b111 | | 0 | ~448 |

| F | ID_M | ID_S | CNT | |
|---|---|---|---|---|
| 1'b1 | 3'b000 | 6'b0000001 | 2 | ~441 |
| 1'b1 | 3'b001 | 6'b1000000 | 1 | ~442 |
| 1'b0 | 3'b010 | | 0 | ~443 |
| 1'b0 | 3'b011 | | 0 | ~444 |
| 1'b0 | 3'b100 | | 0 | ~445 |
| 1'b0 | 3'b101 | | 0 | ~446 |
| 1'b0 | 3'b110 | | 0 | ~447 |
| 1'b0 | 3'b111 | | 0 | ~448 |

| F | ID_M | ID_S | CNT | |
|---|---|---|---|---|
| 1'b1 | 3'b000 | 6'b0000001 | 1 | ~441 |
| 1'b1 | 3'b001 | 6'b1000000 | 1 | ~442 |
| 1'b0 | 3'b010 | | 0 | ~443 |
| 1'b0 | 3'b011 | | 0 | ~444 |
| 1'b0 | 3'b100 | | 0 | ~445 |
| 1'b0 | 3'b101 | | 0 | ~446 |
| 1'b0 | 3'b110 | | 0 | ~447 |
| 1'b0 | 3'b111 | | 0 | ~448 |

| F | ID_M | ID_S | CNT | |
|---|---|---|---|---|
| 1'b1 | 3'b000 | 6'b0000001 | 0 | ~441 |
| 1'b0 | 3'b001 | | 0 | ~442 |
| 1'b0 | 3'b010 | | 0 | ~443 |
| 1'b0 | 3'b011 | | 0 | ~444 |
| 1'b0 | 3'b100 | | 0 | ~445 |
| 1'b0 | 3'b101 | | 0 | ~446 |
| 1'b0 | 3'b110 | | 0 | ~447 |
| 1'b0 | 3'b111 | | 0 | ~448 |

Fig. 11

| F | ID_M | ID_S | CNT | |
|---|---|---|---|---|
| 1'b1 | 3'b000 | | 0 | ─441 |
| 1'b0 | 3'b001 | | 0 | ─442 |
| 1'b0 | 3'b010 | | 0 | ─443 |
| 1'b0 | 3'b011 | | 0 | ─444 |
| 1'b0 | 3'b100 | | 0 | ─445 |
| 1'b0 | 3'b101 | | 0 | ─446 |
| 1'b0 | 3'b110 | | 0 | ─447 |
| 1'b0 | 3'b111 | | 0 | ─448 |

440

US 9,021,169 B2

BUS SYSTEM INCLUDING ID CONVERTER AND CONVERTING METHOD THEREOF

CROSS-REFERENCE TO RELATED APPLICATIONS

This U.S. non-provisional patent application claims priority under 35 U.S.C. §119 of Korean Patent Application No. 10-2010-0099958, filed on Oct. 13, 2010, the entire contents of which are hereby incorporated by reference.

TECHNICAL FIELD

The present disclosure relates to a bus system, more particularly, to a bus system wherein a slave device has transaction identifiers having different bit widths than those of a master.

DISCUSSION OF RELATED ART

System-on-a-chip contains various functional blocks on a single integrated chip and is widely used in mobile consumer electronics. The reuse of an IP core, already been designed and verified, is not only effective in shortening the product development time and also in enhancing the reliability of a newly developed system-on-chip.

System-on-a-chip requires a bus system to facilitate communication between a plurality of IP cores that are integrated on a single chip. The representative bus system currently in use is the Advanced Microcontroller Bus Architecture (AMBA) bus of Advanced RISC Machines (ARM) Ltd. The AXI protocol is defined in the AMBA 3.0 specification.

SUMMARY

In an embodiment of the inventive concept, a bus system comprises a plurality of master devices each of which issues a transaction request having a first transaction identifier with a first bit width and a slave device responding to the transaction request having a second transaction identifier with a second bit width and supplying a transaction response having the second transaction identifier to the plurality of master devices, wherein the second bit width has smaller than the first bit width. The embodiment further comprises a bus configured to connect one of the plurality of master devices and the slave device; and an ID converter configured to connect the bus and the slave device and to map the first transaction identifier to the second transaction identifier for providing the second transaction identifier to the slave device and map the second transaction identifier to the first transaction identifier for providing the first transaction identifier to the one of the plurality of master devices.

In further embodiment of the inventive concept, the ID converter comprises a slave interface coupled to one of the plurality of the master device and a master interface coupled to the slave device. The slave device is a semiconductor memory device and also includes a memory controller for operating the semiconductor memory device. The transaction request comprises a read request for a read address, a write request for a write address, and a write data request for a write data. The first transaction identifier is a first read request identifier when the one of the plurality of master devices issues a read request, a first write request identifier when the one of the plurality of master devices issues a write request, and a first write data identifier when the one of the plurality of master devices issues a write data request.

In further embodiment of the inventive concept, the ID converter further comprises a read handshake controller connected between the slave interface and the master interface and a read mapping unit connected between the slave interface and the master interface, wherein the read handshake controller receives the read request from the master device through the slave interface and transmits the read request to the slave device through the master interface and the read mapping unit, in response to a mapping request from the read handshake controller, maps the first read request identifier, which is received from the master device through the slave interface, to a second read request identifier.

In further embodiment of the inventive concept, the read handshake controller outputs the mapping request to the read mapping unit in response to the read request and transmits the read request to the slave device in response to a mapping completion signal from the read mapping unit.

In further embodiment of the inventive concept, the read mapping unit generate the mapping completion signal when the read mapping unit completes to map the first read request identifier to the second read request identifier. The read handshake controller outputs a mapping request to the read mapping unit in response to a read response from the slave device and transmits the read response to the master device in response to a mapping completion signal from the read mapping unit. The read mapping unit maps a second read response identifier received from the slave device to a first read response identifier in response to the mapping request and generates the mapping completion signal when the read mapping unit completes to map the second read response identifier to the first read response identifier. The read handshake controller comprises a first logic circuit configured to output the read request from the slave interface to the master interface in response to the read completion signal form the read mapping unit, a second logic circuit configured to output the read response from the master interface to the slave interface in response to the read completion signal from the read mapping unit, and a mapping request controller configured to output a mapping request to the read mapping unit in response to the read request from the slave interface and receiving the read response from the master interface.

In further embodiment of the inventive concept, the read mapping unit comprises a register array comprising a plurality of registers configured to store a first identifier and a second identifier corresponding to the first identifier, a status array configured to store the status of the register array, a request ID mapping unit configured to map the first read request identifier to the second read request identifier in response to the mapping request on the basis of the status register, and to store the first and second read request identifiers as the first and second identifiers in the register array, respectively, a response ID mapping unit configured to output the first read response identifier corresponding to the second read response identifier to the slave interface in response to the mapping request on the basis of the register array and a counter array comprising a plurality of counters which correspond to the plurality of the register array, respectively, and configured to increase values stored in the counters in response to control of the request ID mapping unit and to decrease the values in response to control of the response ID mapping unit.

In further embodiment of the inventive concept, the ID converter further comprises a write handshake controller connected between the slave interface and the master interface and a write mapping unit connected between the slave interface and the master interface, wherein the write handshake controller receives the write request and write data request from the master device through the slave interface and transmits the write request and write data request to the slave device through the master interface, and the write mapping unit maps the first write request identifier, which is received from the master device through the slave interface, to the second write request identifier, converts the first write data identifier to the second write data identifier, and remaps the second write response identifier, which is received from the slave device through the master interface, to the first write response identifier, according to the control of the write handshake controller.

In further embodiment of the inventive concept, the bus may be based on the Advanced Microcontroller Bus Architecture (AMBA) Advanced eXtensible Interface (AXI) protocol specification. The first transaction identifier further includes information about which one of the plurality of master devices issues the transaction request.

In an embodiment of the inventive concept, a method for converting a transaction identifier in an ID converter in a bus system comprising a master device, a slave device, a bus connecting the master device and the slave device, and the ID converter, the method comprises a step of receiving a transaction request having a first transaction identifier with a first bit width from the master device, a step of mapping the first transaction identifier to a second transaction identifier having a second bit width, and a step of transmitting the transaction request having the second transaction ID to the slave device.

In further embodiment of the inventive concept, the method further comprises a step of receiving a transaction response having the second transaction identifier from the slave device, a step of mapping the second transaction identifier to the first transaction identifier, and a step of transmitting the transaction response having the second transaction identifier to the master device.

In an embodiment of the inventive concept, a bus control method for a bus system having a plurality of master devices comprises a step of granting a transaction request having a first transaction identifier from one of the plurality of master devices, a step of receiving the transaction request, a step of mapping the first transaction identifier to a second transaction identifier, and a step of transmitting the transaction request having the second transaction identifier to a slave device.

In further embodiment of the inventive concept, the step of receiving the transaction request further comprise a step of adding information for identifying the one of the plurality of master devices to the first transaction identifier.

BRIEF DESCRIPTION OF THE DRAWINGS

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings:

FIGS. 6 to 11 are diagrams illustrating a change of data stored in the register array in the mapping and remapping operations of the read mapping unit of FIG. 4;

DETAILED DESCRIPTION OF THE EMBODIMENTS

Exemplary embodiments of the inventive concept will be described below in more detail with reference to the accompanying drawings. The inventive concept may, however, be embodied in different forms and should not be construed as limited to the embodiments set forth herein. Rather, these embodiments are provided so that this disclosure will be thorough and complete, and will fully convey the scope of the inventive concept to those skilled in the art.

Hereinafter, exemplary embodiments of the inventive concept will be described in detail with reference to the accompanying drawings.

Figure 1:
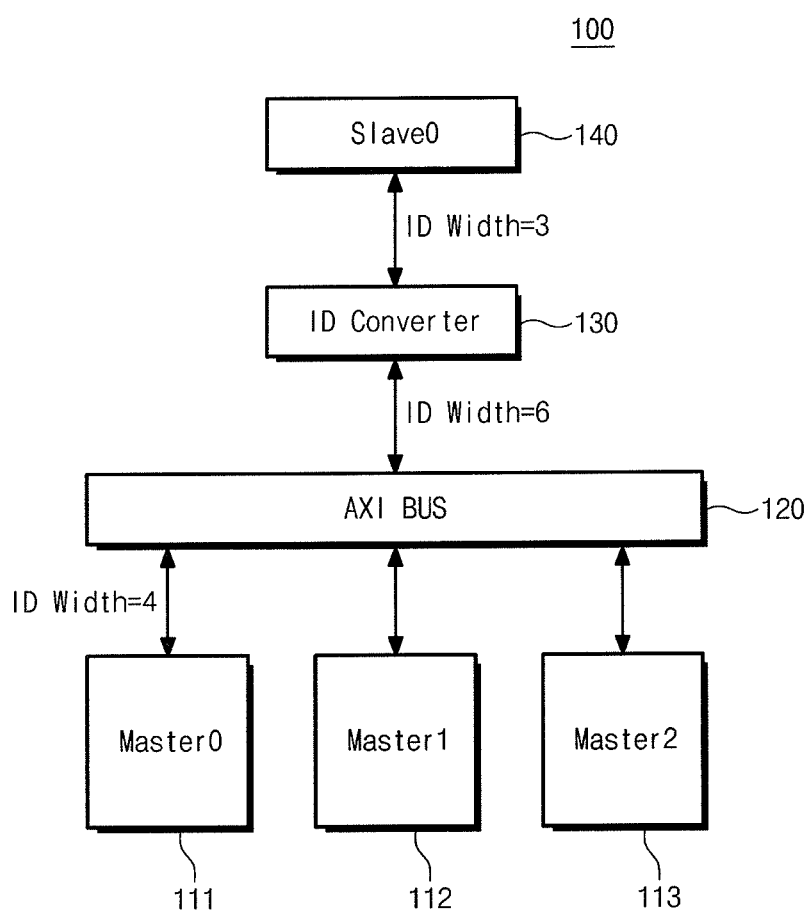
FIG. 1 is a block diagram illustrating a bus system including an ID converter according to an embodiment of the inventive concept.

FIG. 1 is a block diagram illustrating a bus system including an ID converter according to an embodiment of the inventive concept.

Referring to FIG. 1, a bus system 100 includes a plurality of master devices 111, 112, and 113, a bus 120, an ID converter 130, and slave device 140. The plurality of master devices 111, 112, and 113 communicate with the slave device 140 through the bus 120 and the ID converter 130. The bus system 100 of FIG. 1 may be configured to implement various communication protocols between the plurality of masters 111, 112, and 113 and the slave device 140. For example, the bus system 100 may be based on the Advanced Microcontroller Bus Architecture (AMBA) Advanced eXtensile Interface (AXI) protocol.

Each of the plurality of master devices 111, 112, and 113 may include a central processing unit, a micro controller, and a micro processor and output a request signal for accessing the slave device 140 through the bus 120. When more than one of masters 111, 112, and 113 request bus ownership for communicating with the slave device 140 at one time, the ownership is granted to only one master at a time. The master device winning the bus ownership may communicate with the slave device 140.

The slave device 140 may be a semiconductor memory device or another device. For example, the slave device 140 is a semiconductor memory device. Furthermore, the semiconductor memory device may include a memory controller to operate the memory device.

The bus 120 performs the functions of an arbiter and a decoder, and supports a multi-layer bus. The bus 120 may be referred to as an interconnect and be connected to a plurality of master devices and slave devices. The bus 120 receives address information and control information from the master device having bus ownership among the master devices 111, 112, and 113. The bus 120 also transmits a data processing ready request to the slave device 140. The slave device 140 performs the requested data processing, and then the bus 120 transmits a response to the master device having bus ownership.

The bus 120 may include five channels (i.e., channels for read address, read data, write address, write data, and write response) between the master devices 111, 112, and 113 and slave device 140. The channels may operate independently of each other. Using the AXI protocol, the bus 120 may support multiple outstanding transactions and a data re-ordering operation for enhancing system performance. Such functions require a transaction identifier to uniquely identify transactions between the plurality of masters 111, 112, and 113 and the slave device 140.

When the master devices 111, 112, and 113 and the slave device 140 have different specifications, the transaction identifiers of the master devices 111, 112, and 113 may have a different bit width from that of the slave device 140.

For example, the master transaction identifier generated by the master devices 111, 112, and 113 has 4 bits in width, and the slave transaction identifier used by the slave device 140 has 3 bits in width. The bus 120 may add 2 bits to the bit width of the master transaction identifier to identify which one of the master devices 111, 112, and 113 generates the master transaction identifier. The master transaction identifier that is finally output from the bus 120 has 6 bits in width. Although the number of the master transaction identifiers generated by the plurality of master devices 111, 112, and 113 is 64, the slave device 140 can only identify eight master transaction identifiers since the slave device 140 has a transaction identifier having 3 bits in width. This mismatch may result in performance degrade of the bus system 100.

The bus system 100 according to the embodiment of the inventive concept includes an ID converter between the bus 120 and the slave device 140. When a transaction request is received from the master devices 111, 112, and 113 through the bus 120, the ID converter 130 maps the transaction identifier from the master devices to a new transaction identifier to provide the mapped new transaction identifier to the slave device 140, and reversely maps a transaction identifier from the slave device 140 to the original identifier to provide the reversely mapped original identifier to the master devices. In this way, the bus system 100 including the ID converter 130 can support the AXI protocol and minimize performance degrade due to the difference between the transaction identifier bit widths.

Figure 2:
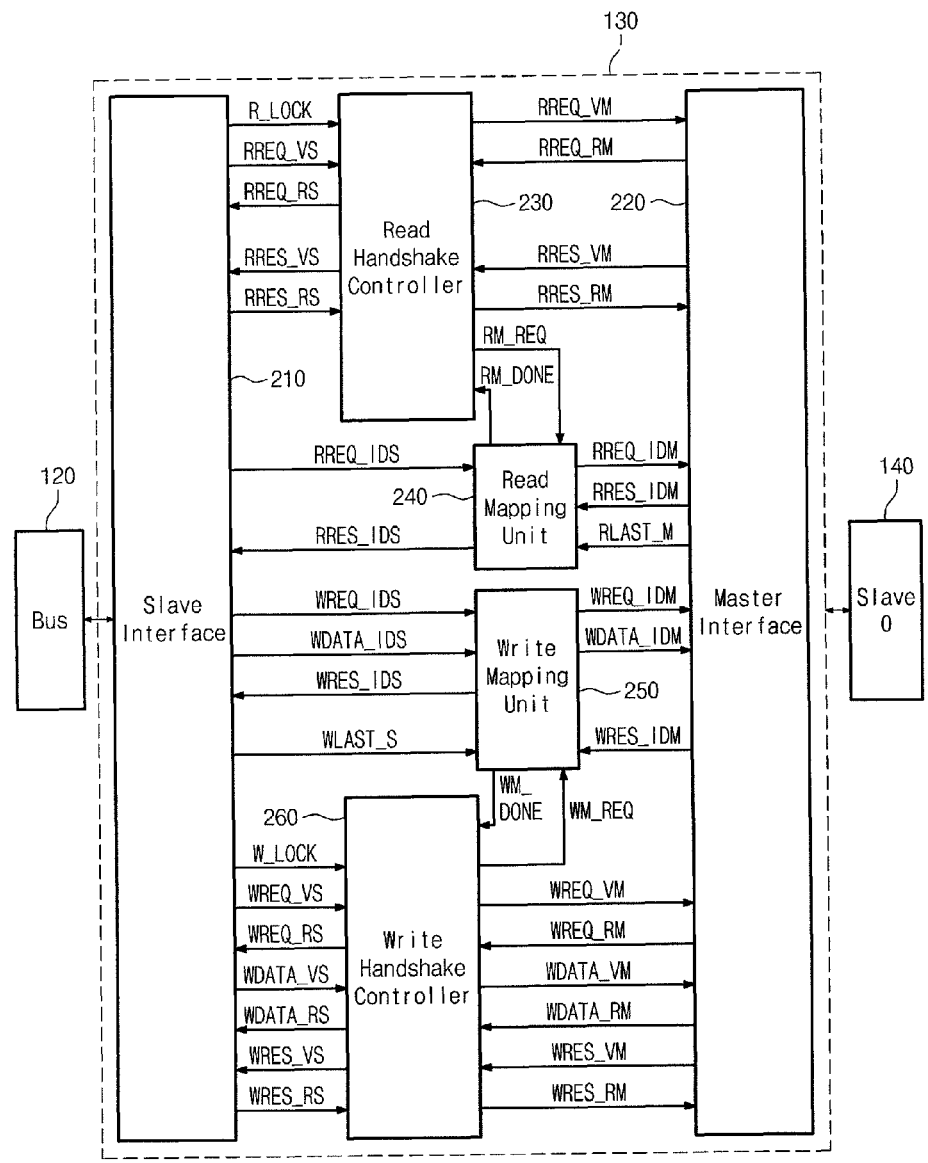
FIG. 2 is a block diagram of an exemplary configuration of the ID converter of FIG. 1.

FIG. 2 is a block diagram illustrating the detailed configuration of the ID converter of FIG. 1.

Referring to FIG. 2, the ID converter 130 includes a slave interface 210, a master interface 220, a read handshake controller 230, a read mapping unit 240, a write mapping unit 250, and a write handshake controller 260.

The slave interface 210 is connected to the bus 120, and the master interface 220 is connected to the slave device 140. The slave device 140 can be a semiconductor memory device that may include two operation modes: a read and write operation. In a read mode where the plurality of masters 111, 112, and 113 access to the slave device 140 and retrieve data stored in the slave device 140, the read handshake controller 230 and the read mapping unit 240 operate to accommodate the transaction identifier mismatch. In a write mode where the plurality of masters 111, 112, and 113 access to the slave device 140 and store data in the slave device 140, the write mapping unit 250 and the write handshake controller 260 operate to accommodate the transaction identifier mismatch.

The read handshake controller 230 operates in response to a read request from the master devices 111, 112, and 113 connected to the bus 120. In the embodiment, the read request being generated by one of the master devices 111, 112, and 113 connected to the bus 120 will be described below as an example. For simplicity of explanation, it is assumed that the master device 111 wins bus ownership and as a result the master device 111 communicates with the slave device 140 through the bus 120 and the ID converter 130.

For a read address transaction, the master device 111 issues a first read request signal RREQ_VS to the read handshake controller 230. The read handshake controller 230 suspends the delivery of the first read request signal RREQ_VS to the slave device 140 until it receives a completion signal RM_DONE from the read mapping unit 240. The read handshake controller 230 also transmits a mapping request signal RM_REQ to the read mapping unit 240. The read mapping unit 240, in response to the mapping request signal RM_REQ, maps a first read request identifier RREQ_IDS from the master device 111 to a second read request identifier RREQ_IDM. When the read mapping unit 240 completes to map the first read request identifier RREQ_IDS to the second read request identifier RREQ_IDM, the read mapping unit 240 outputs the second read request identifier RREQ_IDM to the slave device 140. The read mapping unit 240 also outputs a completion signal RM_DONE to the read handshake controller 230.

The read handshake controller 230 transmits the first read request signal RREQ_VS as a second read request signal RREQ_VM to the slave device 140 through the master interface 220 in response to the completion signal RM_DONE.

The read handshake controller 230 also receives a second read ready signal RREQ_RM from the slave device 140 and transmit the second read ready signal RREQ_RM to the master device 111 as a first read ready signal RREQ_RS through the master interface 220.

The read handshake controller 230 sends a mapping request signal RM_REQ to the read mapping unit 240 in response to the second read response ready signal RRES_VM, which is received from the slave device 140.

The read mapping unit 240, in response to the mapping request signal RM_REQ, reversely maps a second read response identifier RRES_IDM from the slave device 140 to a first read response identifier RRES_IDS, outputting the reversely-mapped first read response identifier RRES_IDS. When the operation of reverse mapping of the second read response identifier RREQ_IDM to the first read response identifier RRES_IDS is completed, the read mapping unit 240 outputs the completion signal RM_DONE to the read handshake controller 230.

The read handshake controller 230 receives a second read response ready signal RRES_VM from the slave device 140 and transmits the second read response ready signal RRES_VM to the master device 140 through the master interface 220 as a first read response ready signal RRES_VS. The read mapping unit 240 transmits the reversely-mapped first read response identifier RRES_IDS to the master device 111.

For a write address transaction, the master device 111 that wins the bus ownership issues a first write request signal WREQ_VS to the write handshake controller 260. The write handshake controller 260 suspends the delivery of the first write request signal WREQ_VS to the slave device 140 until it receives a completion signal WM_DONE from the read write mapping unit 250. The write handshake controller also transmits a mapping request signal WM_REQ to the write mapping unit 250. The write mapping unit 250, in response to the mapping request signal WM_REQ, maps a first write request identifier WREQ_IDS from the master device 111 to the second write request identifier WREQ_IDM. When the write mapping unit 250 completes to map the first write request identifier WREQ_IDS to the second write request identifier WREQ_IDM, the write mapping unit 250 outputs the second write request identifier WREQ_IDM to the slave device 140. The write mapping unit 250 also outputs a completion signal WM_DONE to the write handshake controller 260.

The write handshake controller 260 transmits the first write request signal WREQ_VS as a second write request signal WREQ_VM to the slave device 140 through the master interface 220.

The write handshake controller 260 also receives a second write ready signal WREQ_RM from the slave device 140 and transmit the second write ready signal WREQ_RM to the master device 111 as a first write ready signal WREQ_RS through the master interface 220.

The write handshake controller 260 sends a mapping request signal RM_REQ to the write mapping unit 240 in response to a second write response signal WRES_VM, which is received from the slave device 140 through the master interface 220.

The write mapping unit 250, in response to the mapping request signal WM_REQ, reversely maps a second write response identifier WRES_IDM from the slave device 140 to a first write response identifier WRES_IDS, outputting the reversely-mapped first write response identifier WRES_IDS. When the operation of reverse mapping of the second write response identifier WRES_IDM to the first write response identifier WRES_IDS is completed, the write mapping unit 250 outputs the completion signal WM_DONE to the write handshake controller 260.

The write handshake controller 260 receives a second write response ready signal WRES_VM from the master interface 220, transmitting the second write response ready signal WRES_VM to the bus 120 as a first write response ready signal WRES_VS through the slave interface 210. The write mapping unit 250 transmits the reversely-mapped first write response identifier WRES_IDS to the slave interface 210.

For a write data transaction request, the write handshake controller 260 and the write mapping unit 250 operate similarly to the write address transaction request that has been described above. However, the write handshake controller 260 operates in response to a first write data request signal WDATA_VS instead of the first write request signal WREQ_VS from the master device 111, and delivers a write data response signal WDATA_RM from the slave device 140 as a write data response signal WDATA_RS to the master device 111. Signals R_LOCK and W_LOCK from the master device 111 are for atomic access defined in the AXI bus protocol.

Figure 3:
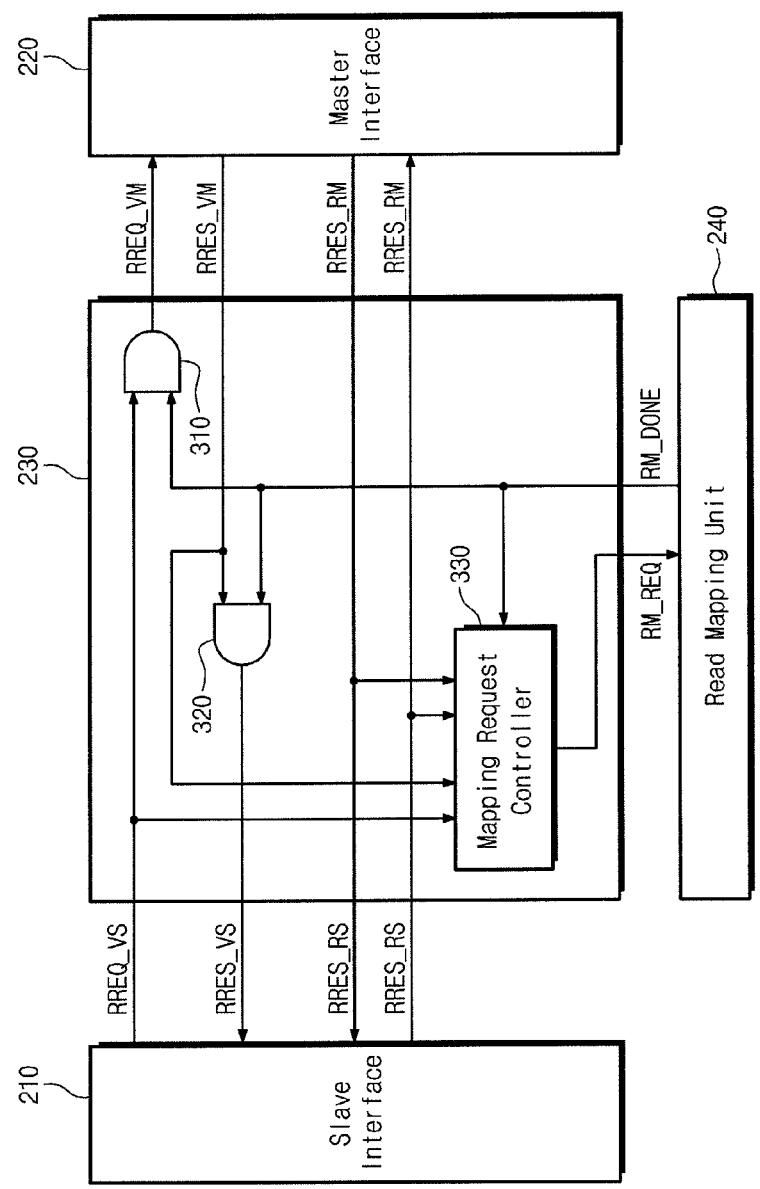
FIG. 3 is a block diagram of a handshake controller of FIG. 2.

FIG. 3 is a block diagram illustrating an example of the detailed configuration of the read handshake controller of FIG. 2.

Referring to FIG. 3, the read handshake controller 230 includes AND gates 310 and 320, and a mapping request controller 330. The AND gate 310 receives a first read request signal RREQ_VS from the master device 111 through the slave interface 210 and receives a mapping completion signal RM_DONE from the read mapping unit 240, to output a second read request signal RREQ_VM. The AND gate 320 receives a second read response signal PRES_VM from the slave device and the mapping completion signal RM_DONE from the read mapping unit 240, to output a first read response ready signal RRES_VS. The second read request signal RREQ_VM from the AND gate 310 is provided to the slave device 140 through the master interface 220. The first read response ready signal RRES_VS from the AND gate 320 is provided to the master device 111 through the slave interface 210. For example, when the mapping completion signal RM_DONE is activated as a high level, each of the AND gates 310 and 320 delivers the first read request signal RREQ_VS and second read response ready signal RRES_VM as outputs, respectively.

When the first read request signal RREQ_VS is received from the master device 111 or the second read response ready signal RRES_VM is received from the slave device 140, the mapping request controller 330 outputs the mapping request signal RM_REQ to the read mapping unit 240.

Figure 4:
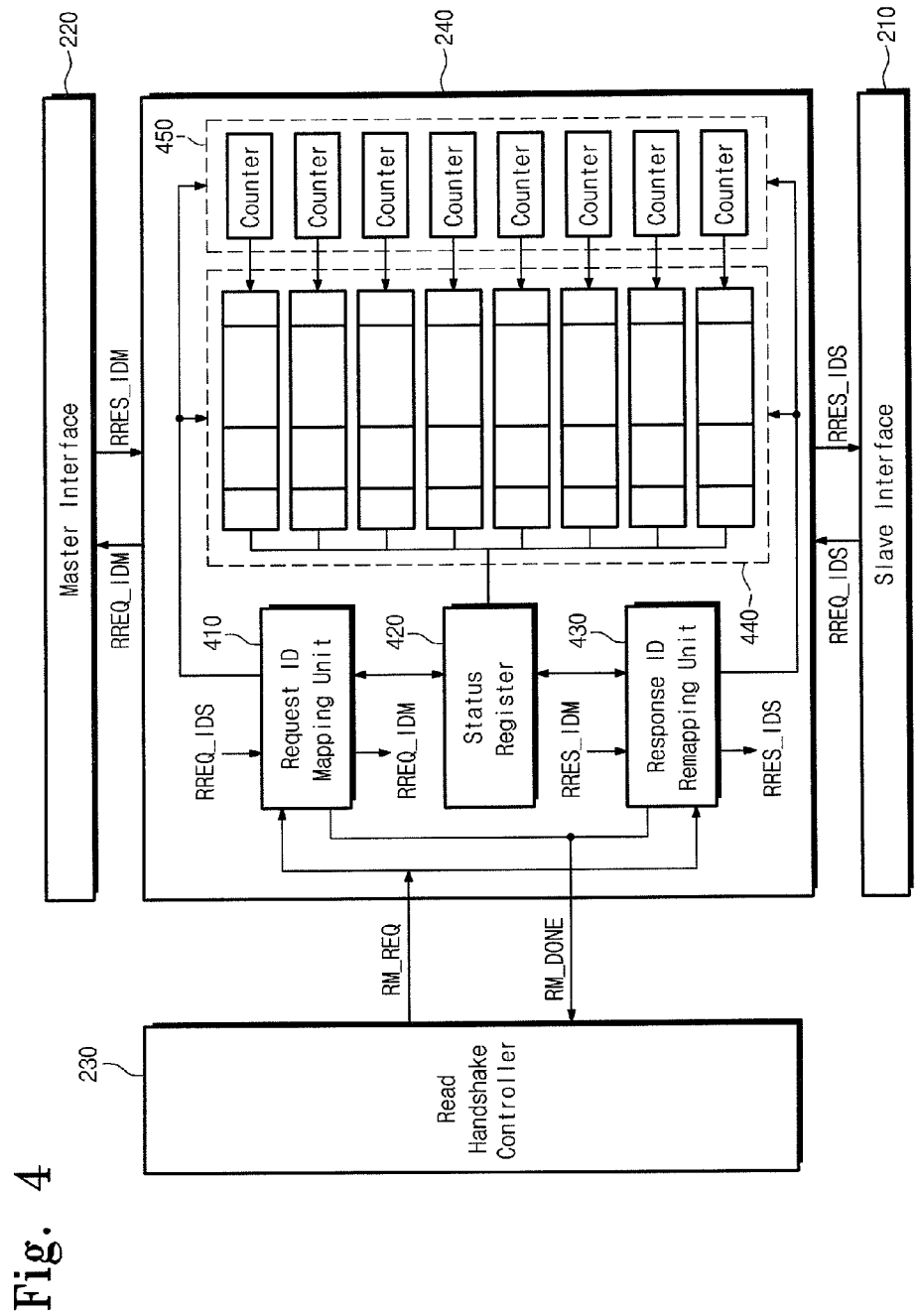
FIG. 4 is a block diagram of a read mapping unit of FIG. 2.

FIG. 4 is a block diagram illustrating an example of the detailed configuration of the read mapping unit of FIG. 2.

Referring to FIG. 4, the read mapping unit 240 includes a request ID mapping unit 410, a status register 420, a response ID remapping unit 430, a register array 440, and a counter array 450. The request ID mapping unit 410 maps a first read request identifier RREQ_IDS from the slave interface 210 to a second read request identifier RREQ_IDM in response to the mapping request signal RM_REQ from the read handshake controller 230, to output the mapped second read request identifier RREQ_IDM. The response ID remapping unit 430 remaps a second read response identifier RRES_IDM from the master interface 220 to a first read response identifier RRES_IDS in response to the mapping request signal RM_REQ from the read handshake controller 230, to output the remapped first read response identifier RRES_IDS. The status register 420 stores information on the status of the each register in the register array 440 according to controls of the request ID mapping unit 410 and response ID remapping unit 430. The register array 440 includes a plurality of registers, each of which stores a mapping entry. The counter array 450 includes a plurality of counters corresponding to the plurality of registers in the register array 440, respectively. In the embodiment, the read mapping unit 240 includes the register array 440 including the plurality of registers. Alternatively, the register array 440 may include another memory device such as a buffer memory.

Figure 5:
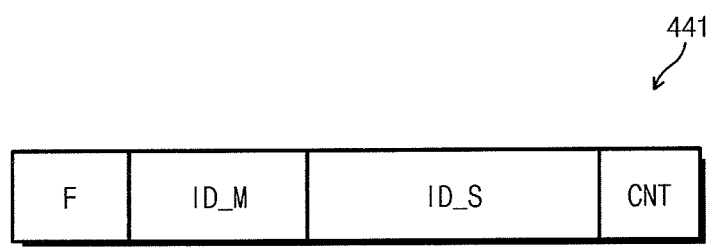
FIG. 5 illustrates an exemplary mapping entry format for a register array of FIG. 4.

FIG. 5 is a diagram illustrating an example of a mapping entry format stored in the register array of FIG. 4.

Referring to FIG. 5, a mapping entry stored in the register array includes fields for storing a flag F, a second identifier ID_M, a first identifier ID_S, and a count value CNT. The second identifier ID_M is a transaction identifier used for the slave device 140. The first identifier ID_S is a transaction identifier received from the master device 111. The flag F has one bit in width and indicates whether information stored in the register 441 is effective. For example, when the first identifier ID_S is mapped to the second identifier ID_M and provided to the slave device 140, the flag F is set to '1'. On the other hand, when the second identifier ID_M is reversely mapped to the first identifier ID_S and is provided to the master device 111, the flag F is cleared to '0'.

The first identifier ID_S is a transaction identifier received from the master device 111. The second identifier ID_M is a transaction identifier to be transmitted to the slave device 140. The bit widths of the first identifier ID_S and second identifier ID_M may be configured according to the bit width of the transaction identifier based on specifications of the mater devices 111, 112, and 113 and slave device 140. For example, when the transaction identifier received from the master device 111 is 6 bits in width, the first identifier ID_S is 6 bits in width. When the transaction identifier used for the slave device 140 is 3 bits in width, the second identifier ID_M is 3 bits in width.

The count value CNT is the net number of times the first identifier ID_S is mapped to the second identifier ID_M. For example, when the first identifier ID_S from the master device 111 is mapped three times and provided to the slave device 140, the count value CNT is three. When the second identifier ID_M is remapped to the first identifier ID_S, the count value decreases by one. As defined in the AXI protocol, the count value CNT is used for constant ordering of the transaction identifiers generated with the same transaction identifier.

The request ID mapping unit 410, in FIG. 4, maps a first read request identifier RREQ_IDS to a second read request identifier RREQ_IDM on the basis of information stored in the status register 420, and stores the first read request identifier RREQ_IDS and second read request identifier RREQ_IDM in the register array 440. The request ID mapping unit 410 increases by one the count value CNT of the counter in the counter array 450, which corresponds to the register where the first read request identifier RREQ_IDS and the second read request identifier RREQ_IDM are stored in the register array 440. The changed count value CNT of the counter array 450 is stored in the corresponding register in the register array 440.

The response ID remapping unit 430 provides a first read request identifier RREQ_IDS corresponding to a second read response identifier RREQ_IDM to the slave interface 210 on the basis of information stored in the status register 420. Since the first read request identifier RREQ_IDS corresponding to the second read request identifier RREQ_IDM is the address of the register in the register array 440, the latency is zero when the second read response identifier RREQ_IDM is remapped to the first read response identifier RRES_IDS.

FIGS. 6 to 11 are diagrams illustrating how data stored in the register array change when the read mapping unit of FIG. 4 performs the mapping and reverse mapping operations.

For example, the register array 440, FIG. 6, includes eight registers 441 to 448 suitable for the bit width (i.e., 3 bits) of the transaction identifier of the slave device 140 of FIG. 1. The number of registers included in the register array 440 may be determined according to the bit width of the transaction identifier of the slave device 140. Binary numbers "000" to "111" are assigned to the registers 441 to 448 as the second identifier ID_M, respectively. The sequence of assigning the second identifier ID_M to each of the registers 441 to 448 may be determined by a plurality of master devices 111, 112, and 113.

Referring to FIGS. 4 and 6, when a request ID mapping unit 410 receives a mapping request signal RM_REQ from the read handshake controller 230 and a first read request identifier RREQ_IDS '0000001' from the slave interface 210, the request ID mapping unit 410 checks whether the first read request identifier RREQ_IDS '0000001' has been stored as a first identifier ID_S in the registers 441 to 448 on the basis of the status register 420. If the first read request identifier RREQ_IDS '0000001' has not been stored in any registers 441 to 448, it is stored as a first identifier ID_S in the register 441. The request ID mapping unit 410 also sets the flag bit of the register 441 to '1' and increases count value CNT by one.

The request ID mapping unit 410 provides the second identifier ID_M '000' corresponding to the first identifier ID_S '0000001' stored in the register 441 as a second read request identifier RREQ_IDM to the master interface 220. Then, the changed status information of the register array 440 is stored in the status register 420.

Referring to FIG. 7, when the request ID mapping unit 410 receives a mapping request signal RM_REQ from the read handshake controller 230 and a first read request identifier RREQ_IDS '1000000' from the slave interface 210, the request ID mapping unit 410 stores the first read request identifier RREQ_IDS '1000000' as a first identifier ID_S in the register 442. The request ID mapping unit 410 also set the flag bit of the register 442 to '1', and increases the count value CNT by one. The request ID mapping unit 410 provides the second identifier ID_M '001', corresponding to the first identifier ID_S '1000000' stored in the register 442, as a second read request identifier RREQ_IDM to the master interface 220.

Referring to FIG. 8, when the request ID mapping unit 410 receives a mapping request signal RM_REQ from the read handshake controller 230 and a first read request identifier RREQ_IDS '0000001' from the slave interface 210, the request ID mapping unit 410 checks whether the first read request identifier RREQ_IDS '0000001' has been stored as a first identifier ID_S in the registers 441 to 448 of the register array 440 on the basis of the status register 420. Since the first read request identifier RREQ_IDS '0000001' has been stored in the register 441, the count value CNT of the register 441 increases by one to '2'.

The request ID mapping unit 410 provides the second identifier ID_M '000', corresponding to the first identifier ID_S '0000001' stored in the register 441, as the second read request identifier RREQ_IDM to the master interface 220.

Referring to FIG. 9, when the response ID remapping unit 430 receives a mapping request signal RM_REQ from the read handshake controller 230 and a second read response identifier RRES_IDM '000' from the master interface 220, the response ID remapping unit 430 provides the first identifier ID_S '0000001', corresponding to the second read response identifier RRES_IDM '000', as a first read response identifier RRES_IDS to the slave interface 210. The request ID remapping unit 430 checks whether the second read response identifier RRES_IDM '000' has been stored as a second identifier ID_M in the registers 441 to 448 of the register array 440 on the basis of the status register 420. Since the second read response identifier RRES_IDM '000' has been stored in the register 441, the response ID remapping unit 430 also decreases the count value CNT by one to '1', and maintain the flag bit as '1' since the count value CNT is '1'.

Referring to FIG. 10, when the response ID remapping unit 430 receives a mapping request signal RM_REQ from the read handshake controller 230 and a second read response identifier RRES_IDM '001' from the master interface 220, the response ID remapping unit 430 provides the first identifier ID_S '0000000' corresponding to the second read response identifier RRES_IDM '001' as a first read response identifier RRES_IDS to the slave interface 210. The request ID remapping unit 430 checks whether the second read response identifier RRES_IDM '001' has been stored as a second identifier ID_M in the registers 441 to 448 of the register array 440 on the basis of the status register 420. Since the second read response identifier RRES_IDM '001' has been stored in the register 442, the response ID remapping unit 430 also decreases the count value CNT by one to '0', and sets the flag bit as '0' since the count value CNT is '0'.

Referring to FIG. 11, when the response ID remapping unit 430 receives a mapping request signal RM_REQ from the read handshake controller 230 and a second read response identifier RRES_IDM '000' from the master interface 220, the response ID remapping unit 430 provides the first identifier ID_S '0000001' corresponding to the second read response identifier RRES_IDM '000' as the first read response identifier RRES_IDS to the slave interface 210. The request ID remapping unit 430 checks whether the second read response identifier RRES_IDM '000' has been stored as a second identifier ID_M in the registers 441 to 448 of the register array 440 on the basis of the status register 420. Since the second read response identifier RRES_IDM '000' has been stored in the register 441, the response ID remapping unit 430 also decreases the count value CNT by one to '0', and sets the flag bit as '0' since the count value CNT is '0'. The request ID mapping unit 410 and the response ID remapping unit 430 in the read mapping unit 240 of FIG. 4 output the mapping completion signal RM_DONE to the read handshake controller 230 when mapping and reverse mapping operations are completed.

As explained above, the read mapping unit 240 may map a first read request identifier RREQ_IDS, which is received from the master device 111 through the slave interface 210, to a second read request identifier RREQ_IDM, providing the mapped second read request identifier RREQ_IDM to the slave device 140 through the master interface 220. The read mapping unit 240 may also reversely map a second read response identifier RRES_IDM, which is received from the slave device 140 through the master interface 220, to a first read response identifier RRES_IDS, providing the reversely mapped first read response identifier RRES_IDS to the master device 111 through the slave interface 210.

The write handshake controller 260 and write mapping unit 250 may be constructed in a similar way as the read handshake controller 230 and read mapping unit 240, respectively. However, the write handshake controller 260 receives a first write request signal WREQ_VS and a first write data request signal WDATA_VS. The write mapping unit 250 maps a first write request identifier WREQ_IDS to a second write request identifier WREQ_IDM and maps the first write data identifier WDATA_IDS to the second write data identifier WDATA_IDM. The write mapping unit 250 also reversely maps a second write response identifier WRES_IDM to a first write response identifier WRES_IDS.

Figure 12:
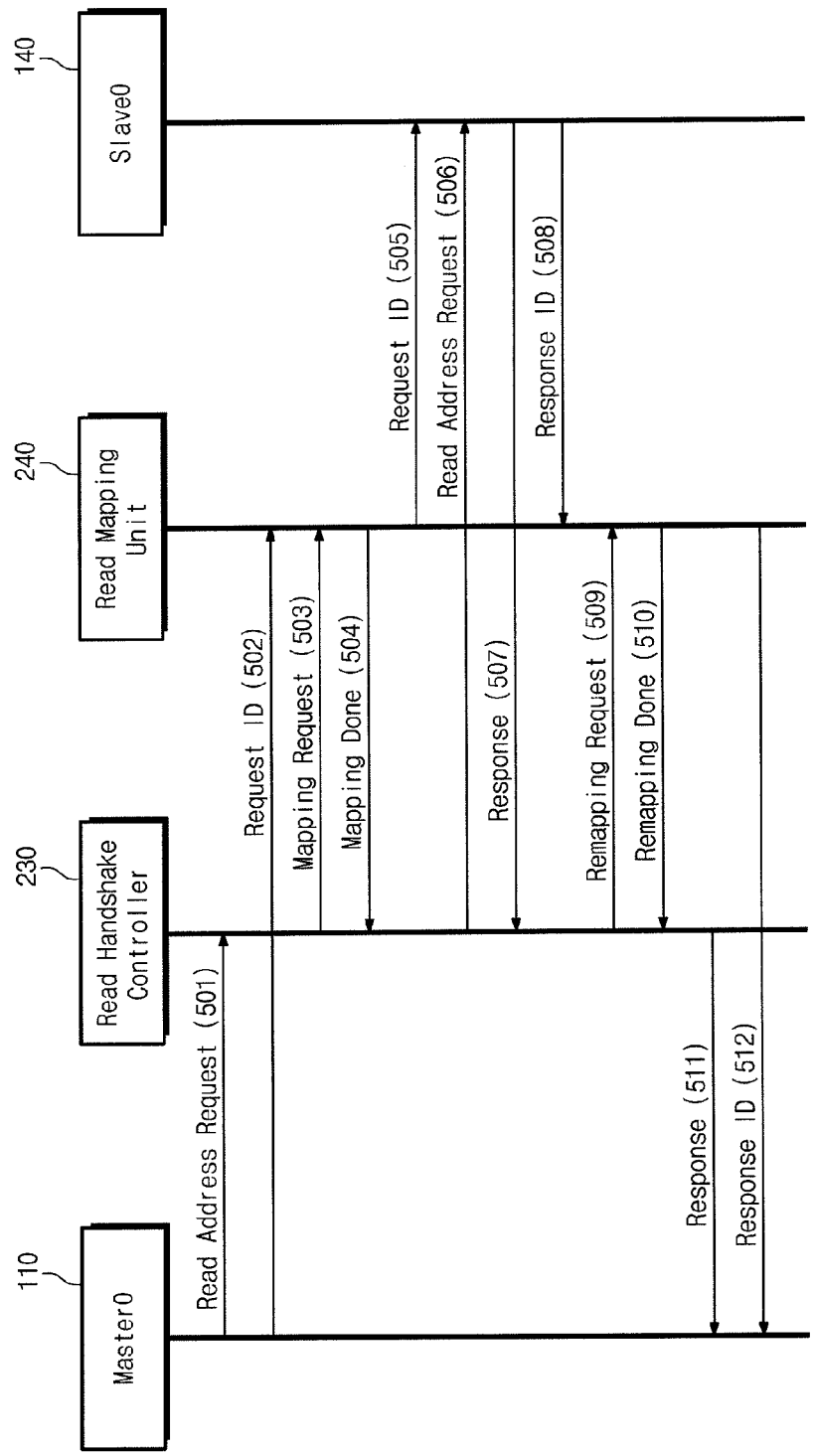
FIG. 12 is a diagram illustrating the operation order of the ID converter of FIG. 2 in response to a read address request of the master device.

FIG. 12 is a diagram illustrating the operation sequence of the ID converter of FIG. 2 in response to a read address request of the master device. Each operation is numbered in parentheses. For simplicity of explanation, it is assumed that the master device 111 wins bus ownership and as a result the master device 111 communicate with the slave device 140 through the bus 120 and the ID converter 130.

Referring to FIG. 12, in operation 501, the read handshake controller 230 receives a read address request from the master device 111. In operation 502, the read mapping unit 240 receives a first read request identifier RREQ_IDS from the master device 111. In operation 503, the read handshake controller 230 requests a mapping operation to the read mapping unit 240. The read mapping unit 240 maps the first read request identifier RREQ_IDS, which is received from the master device 111, to a second read request identifier RREQ_IDM. In operation 504, when completing the mapping operation 240, the read mapping unit 240 transmits a mapping completion signal RM_DONE to the read handshake controller 230. In operation 505, the read mapping unit 240 transmits the mapped second read request identifier RREQ_IDM to the slave device 140 through the master interface 210. In operation 506, the read handshake controller 230, in response to the mapping completion signal RM_DONE, transmits the first read request signal RREQ_VS as a second read request signal RREQ_VM to the slave device 140.

In operation 507, the read handshake controller 230 receives the response ready signal RRES_VM from the slave device 140. In operation 508, the read mapping unit 240 receives the second read response identifier RRES_IDM from the slave device 140.

In operation 509, the read handshake controller 230 requests a reverse mapping operation to the read mapping unit 240. In operation 510, the read mapping unit 240 reversely maps a second read response identifier RRES_IDM, which is received from the slave device 140, to a first read response identifier RRES_IDS, and when completing the reverse mapping operation 510, the read mapping unit 240 transmits a mapping completion signal RM_DONE to the read handshake controller 230. In operation 512, the read mapping unit 240 transmits the reversely mapped first read response identifier RRES_IDS to the master device 111 through the slave interface 210.

As explained above, the bus system 100 can perform a read address transaction according to the AXI protocol even when the bit widths of the transaction identifiers of a plurality of master devices 111, 112, and 113 and slave device 140 differ.

Figure 13:
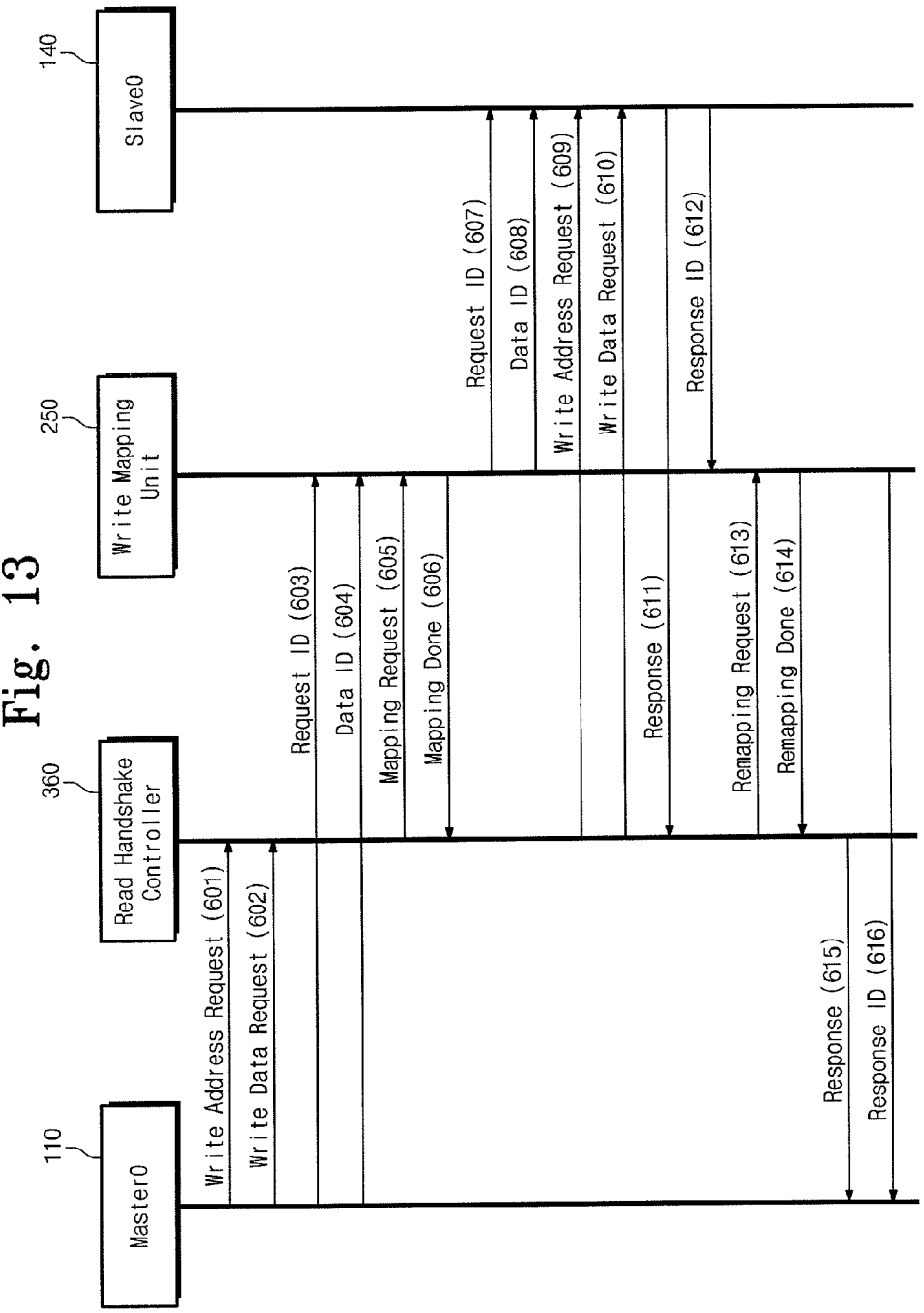
FIG. 13 is a diagram illustrating the operation order of the ID converter of FIG. 2 in response to write address and write data requests of the master device.

FIG. 13 is a diagram illustrating the operation order of the ID converter of FIG. 2 in response to write address and write data requests of the master device. Each operation is numbered in parentheses. For simplicity of explanation, it is assumed that the master device 111 wins bus ownership and as a result the master device 111 communicate with the slave device 140 through the bus 120 and the ID converter 130.

Referring to FIG. 13, in operations 601, the write handshake controller 260 receives a first write request signal WREQ_VS from the master device 111. In operation 602, the write handshake controller 260 receives the first write data request signal WDATA_VS. In operation 603, the write mapping unit 240 receives a first write request identifier WREQ_IDS from the master device 111. In operation 604, the write mapping unit 240 receives a first write data identifier WDATA_IDS. In operation 605, the write handshake controller 250 requests a mapping operation to the write mapping unit 250. The write mapping unit 250 maps the first write request identifier WREQ_IDS received from master device 111 to a second write request identifier WREQ_IDM, and maps the first data identifier WDATA_IDS to the second data identifier WDATA_IDM. In operation 606, the write mapping unit 250 transmits a mapping completion signal WM_DONE to the write handshake controller 260. In operation 607, the write mapping unit 250 transmits the mapped second write request identifier WREQ_IDM to the slave device 140 through the master interface 210. In operation 608, the write mapping unit 250 transmits the mapped second write data identifier WDATA_IDM to the slave device 140 through the master interface 210. In operation 609, the write handshake controller 260, in response to the mapping completion signal WM_DONE, transmits a write request signal WREQ_VS to the slave device 140. In operation 610, the write handshake controller 260 transmits a first write data request signal WDATA_VS to the slave device 140.

In operation 611, the write handshake controller 260 receives a second write ready signal WREQ_RM from the slave device 140. In operation 612, the write mapping unit 250 receives a second write response identifier WREQ_IDM from the slave device 140. In operation 613, the write handshake controller 260 requests a reverse mapping operation to the write mapping unit 250. In operation 614, the write mapping unit 250 reversely maps the second write response identifier WRES_IDM received from the slave device 140 to a first write response identifier WRES_IDS, and when completing the reverse mapping operation 614, the write mapping unit 250 transmits a mapping completion signal WM_DONE to the write handshake controller 260. In operation 615, the write handshake controller 260 transmits the first write ready signal WREQ_RS to the master device 111 through the slave interface 210. In operation 616, the write mapping unit 250 transmits the reversely mapped first write response identifier WRES_IDS to the master device 111 through the slave interface 210.

As explained above, the bus system 100 can perform a write address transaction and a write data transaction according to the AXI protocol even when the bit widths of the transaction identifiers of the master device 111 and slave device 140 differ.

According to the embodiments of the inventive concept, even when a master device has a transaction identifier bit width different from that of its slave device, an ID converter 130 enables the master device to communicate transactions with the slave device according to the AMBA AXI protocol. Moreover, the ID converter may minimize performance degradation that results from the different width of transaction identifiers from the slave device and the master device.

The above-disclosed subject matter is to be considered illustrative and not restrictive, and the appended claims are intended to cover all such modifications, enhancements, and other embodiments, which fall within the true spirit and scope of the inventive concept. Thus, to the maximum extent allowed by law, the scope of the inventive concept is to be determined by the broadest permissible interpretation of the following claims and their equivalents, and shall not be restricted or limited by the foregoing detailed description.

What is claimed is:

1. A bus system, comprising:
   a plurality of master devices, each configured to issue a transaction request having a first transaction identifier with a first bit width;
   a slave device configured to respond to the transaction request having a second transaction identifier with a second bit width and to supply a transaction response having the second transaction identifier to the plurality of master devices, wherein the second bit width of the second transaction identifier is smaller than the first bit width of the first transaction identifier;
   a bus configured to connect one of the plurality of master devices and the slave device; and
   an ID converter configured to:
      connect the bus and the slave device;
      map the first transaction identifier of the one of the plurality of the master devices to the second transaction identifier;
      provide the second transaction identifier to the slave device;
      reversely map the second transaction identifier to the first transaction identifier; and
      provide the first transaction identifier to the one of the plurality of master devices,
   wherein the ID converter comprises a register array configured to store the first transaction identifier and the second transaction identifier as a mapping entry, and
   wherein the ID converter further comprises a slave interface coupled to one of the plurality of the master devices, and a master interface coupled to the slave device,
   wherein the ID converter further comprises a read mapping unit,
   wherein the read mapping unit comprises:
      a status array configured to store a status of the register array;
      a request ID mapping unit configured to map a first read request identifier to a second read request identifier in response to a mapping request on the basis of the status register, and to store the first and second read request identifiers as the first and second transaction identifiers in the register array, respectively;
      a response ID mapping unit configured to output a first read response identifier corresponding to a second read response identifier to the slave interface in response to a mapping request on the basis of the register array; and
      a counter array comprising a plurality of counters which corresponds to the plurality of the register array, respectively, and configured to increase values stored in the counters in response to control of the request ID mapping unit and to decrease the values in response to control of the response ID mapping unit.

2. The bus system of claim 1, wherein the slave device is a semiconductor memory device.

3. The bus system of claim 2, wherein the semiconductor memory device includes a memory controller for operating the semiconductor memory device.

4. The bus system of claim 2, wherein the transaction request comprises a read request for a read address, a write request for a write address, and a write data request for a write data.

5. The bus system of claim 4, wherein,
   the first transaction identifier is a first read request identifier when the one of the plurality of master devices issues a read request,
   the first transaction identifier is a first write request identifier when the one of the plurality of master devices issues a write request, and
   the first transaction identifier is a first write data identifier when the one of the plurality of master devices issues a write data request.

6. The bus system of claim 5, wherein the ID converter further comprises:
   a read handshake controller connected between the slave interface and the master interface,
   wherein the read handshake controller is configured to receive the read request from the master device through the slave interface and transmit the read request to the slave device through the master interface, and
   the read mapping unit, in response to a mapping request from the read handshake controller, is configured to map the first read request identifier, which is received from the master device through the slave interface, to a second read request identifier.

7. The bus system of claim 6, wherein the read handshake controller is configured to output the mapping request to the read mapping unit in response to the read request and transmit the read request to the slave device in response to a mapping completion signal from the read mapping unit.

8. The bus system of claim 6, wherein the read mapping unit is configured to generate the mapping completion signal when the read mapping unit completes to map the first read request identifier to the second read request identifier.

9. The bus system of claim 8, wherein the read handshake controller is configured to output a mapping request to the read mapping unit in response to a read response from the slave device and transmit the read response to the master device in response to the mapping completion signal from the read mapping unit.

10. The bus system of claim 9, wherein the read mapping unit is configured to map a second read response identifier received from the slave device to a first read response identifier in response to the mapping request and generate the mapping completion signal when the read mapping unit completes to map the second read response identifier to the first read response identifier, wherein the register array stores the first read response identifier and the second read response identifier corresponding to the first read response identifier, and wherein the first and second read response identifiers correspond to the first and second transaction identifiers, respectively.

11. The bus system of claim 10, wherein the read handshake controller comprises:

a first logic circuit configured to output the read request from the slave interface to the master interface in response to the read completion signal form the read mapping unit;
a second logic circuit configured to output the read response from the master interface to the slave interface in response to the read completion signal from the read mapping unit; and
a mapping request controller configured to output a mapping request to the read mapping unit in response to the read request from the slave interface and receiving the read response from the master interface.

12. The bus system of claim 6, wherein the ID converter further comprises:
a write handshake controller connected between the slave interface and the master interface; and
a write mapping unit connected between the slave interface and the master interface,
wherein the write handshake controller is configured to receive the write request and write data request from the master device through the slave interface and transmit the write request and write data request to the slave device through the master interface, and
the write mapping unit is configured to map the first write request identifier, which is received from the master device through the slave interface, to the second write request identifier, convert the first write data identifier to the second write data identifier, and remap the second write response identifier, which is received from the slave device through the master interface, to the first write response identifier, according to the control of the write handshake controller.

13. The bus system of claim 1, wherein the bus is based on the Advanced Microcontroller Bus Architecture (AMBA) Advanced eXtensible Interface (AXI) protocol specification.

14. The bus system of claim 1, wherein the first transaction identifier further includes information about which one of the plurality of master devices issues the transaction request.

15. A method for converting a transaction identifier in an ID converter in a bus system comprising a master device, a slave device, a bus connecting the master device and the slave device, and the ID converter the method comprising:
receiving a transaction request having a first transaction identifier with a first bit width from the master device;
mapping the first transaction identifier to a second transaction identifier having a second bit width, based on a mapping entry stored in a register array of the ID converter for storing the first transaction identifier and the second transaction identifier;
transmitting the transaction request having the second transaction identifier to the slave device;
receiving a transaction response having the second transaction identifier from the slave device;
reversely mapping the second transaction identifier to the first transaction identifier, based on the mapping entry; and
transmitting the transaction response having the second transaction identifier to the master device,
wherein the ID converter further comprises a read mapping unit,
wherein the read mapping unit comprises:
a status array configured to store the status of the register array;
a request ID mapping unit configured to map a first read request identifier to a second read request identifier in response to a mapping request on the basis of the status register, and to store the first and second read request identifiers as the first and second transaction identifiers in the register array, respectively;
a response ID mapping unit configured to output a first read response identifier corresponding to a second read response identifier to the slave interface in response to a mapping request on the basis of the register array; and
a counter array comprising a plurality of counters which corresponds to the plurality of the register array, respectively, and configured to increase values stored in the counters in response to control of the request ID mapping unit and to decrease the values in response to control of the response ID mapping unit.

16. A bus control method for a bus system having a plurality of master devices, a slave device and an ID converter, the method comprising:
granting a transaction request having a first transaction identifier with a first bit width from one of the plurality of master devices;
receiving the transaction request;
mapping the first transaction identifier to a second transaction identifier with a second bit width, based on a mapping entry for storing the first transaction identifier and the second transaction identifier; and
transmitting the transaction request having the second transaction identifier to a slave device;
receiving a transaction response having the second transaction identifier from the slave device, based on the mapping entry;
reversely mapping the second transaction identifier to the first transaction identifier; and
transmitting the transaction response having the second transaction identifier to the master device,
wherein the ID converter is configured to map the first transaction identifier of one of the plurality of the master devices to the second transaction identifier to the slave device, and
wherein the ID converter further comprises a read mapping unit,
wherein the read mapping unit comprises:
a status array configured to store a status of the register array;
a request ID mapping unit configured to map a first read request identifier to a second read request identifier in response to a mapping request on the basis of the status register, and to store the first and second read request identifiers as the first and second transaction identifiers in the register array, respectively;
a response ID mapping unit configured to output a first read response identifier corresponding to a second read response identifier to the slave interface in response to a mapping request on the basis of the register array; and
a counter array comprising a plurality of counters which corresponds to the plurality of the register array, respectively, and configured to increase values stored in the counters in response to control of the request ID mapping unit and to decrease the values in response to control of the response ID mapping unit.

17. The bus control method of claim 16, wherein the receiving the transaction request further comprises adding information for identifying the one of the plurality of master devices to the first transaction identifier.

* * * * *